No. 842,679.
PATENTED JAN. 29, 1907.
W. MARTIN.
CAR BRAKE.
APPLICATION FILED MAY 7, 1906.
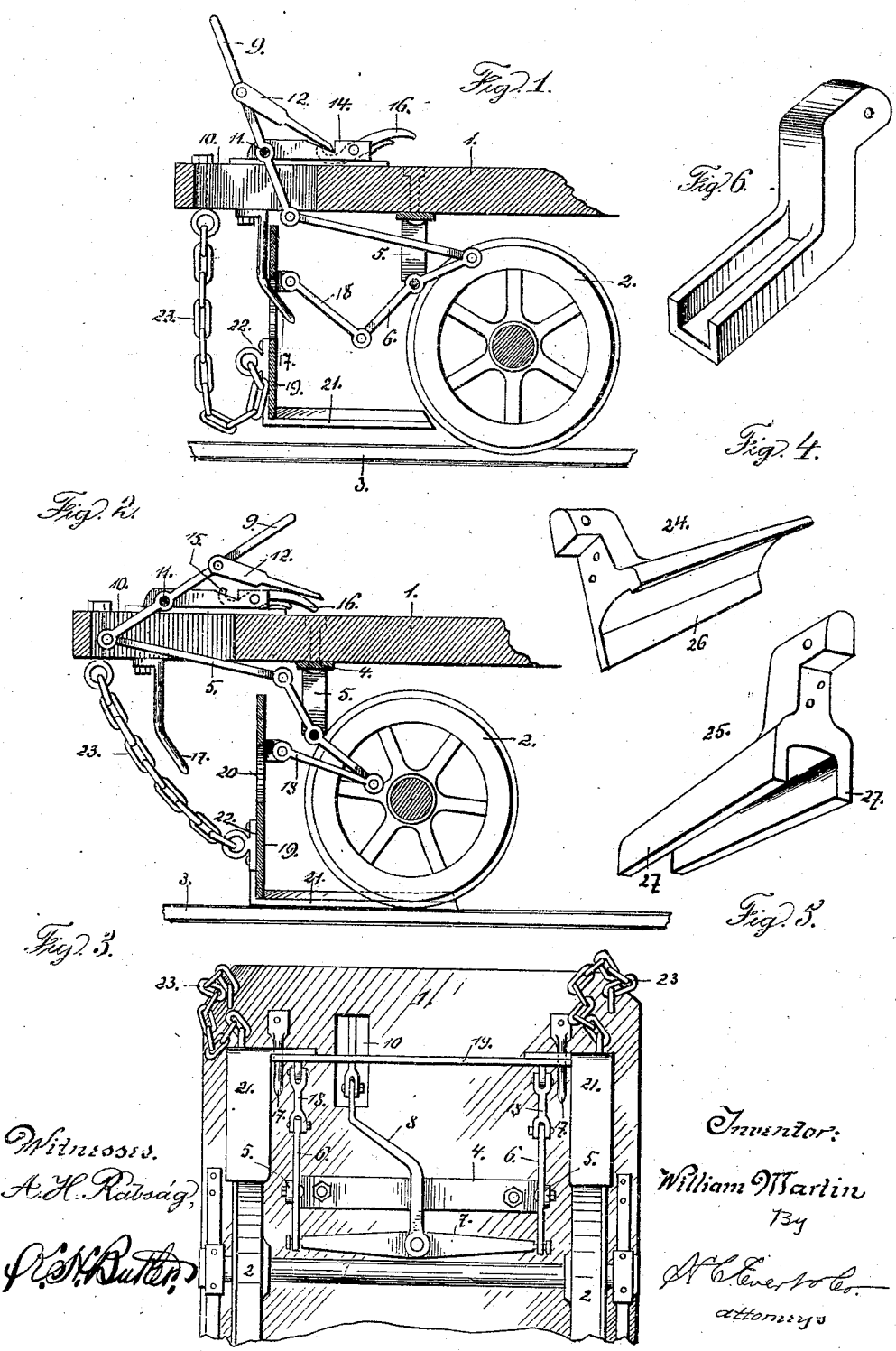

UNITED STATES PATENT OFFICE.

WILLIAM MARTIN, OF WILKINSBURG, PENNSYLVANIA.

CAR-BRAKE.

No. 842,679.　　　　Specification of Letters Patent.　　　　Patented Jan. 29, 1907.

Application filed May 7, 1906. Serial No. 315,656.

*To all whom it may concern:*

Be it known that I, WILLIAM MARTIN, a citizen of the United States of America, residing at Wilkinsburg, in the county of Allegheny and State of Pennsylvania, have invented certain new and useful Improvements in Car-Brakes, of which the following is a specification, reference being had therein to the accompanying drawings.

This invention relates to certain new and useful improvements in car-brakes, and the invention relates more particularly to a safety street-car brake intended for use as an emergency-brake should the motorman or operator of a car lose control of the same upon a declivity or sharp grade.

The primary object of this invention is to provide an emergency and safety brake that can be easily and quickly operated to check the rapidity of a car, the mechanism employed for this purpose being simple in construction, strong and durable, free from all danger of being injured by constant use. To this end I employ shoes which are normally supported above the rails over which the car travels, said shoes being quickly released by the motorman of a car to permit them descending to the rails to check or chuck the car-wheels when the rapidity of the car has become uncontrollable.

The detail construction entering into my invention will be hereinafter more fully described and then specifically pointed out in the claims, and, referring to the drawing accompanying this application, like numerals of reference designate corresponding parts throughout the several views, in which—

Figure 1 is a longitudinal sectional view of a portion of a car equipped with my improved brakes, the brakes being illustrated in their normal position. Fig. 2 is a similar view illustrating the brakes in the operative position. Fig. 3 is a bottom plan of the same. Fig. 4 is a perspective view of one of the shoes that can be used in connection with my improved brakes. Fig. 5 is a similar view of a modified form of shoe. Fig. 6 is a perspective view of a shoe adapted to be used in connection with a vehicle.

In the accompanying drawing the reference-numeral 1 designates the end of a platform or body of a car which is supported upon trucks, the flanged wheels 2 2 of which travel upon rails 3 3.

My invention resides in providing the platform or body 1 of the car with a bracket 4, and pivotally connected to the depending ends 5 5 of said bracket are bell-crank levers 6 6. The rear ends of the levers are connected together by a cross-bar 7, said bar being connected by an angular link 8 to the lower end of a lever 9. The lever 9 extends upwardly through an elongated slot 10, formed in the platform or body 1 of the car and is fulcrumed, as at 11, whereby an oscillatory movement will impart a rocking movement to the bell-crank levers 6 6. To normally hold the lever 9 in a fixed position, said lever is provided with a pivoted pawl 12, adapted to engage in a notched bar 14, carried by the platform or body 1 of the car. In the notched bar 14 is pivotally mounted a latch 15, having a tread 16, which when depressed by the foot of the motorman or operator of the car elevates the pawl 12 and releases the lever 9. The platform or body 1 of the car is also provided with two depending angular arms 17, these arms, in conjunction with links 18 18, supporting a slotted plate 19, the slot 20 of said plate receiving the arms 17 17, while the links 18 18, carried by the bell-crank levers 6, serve to hold the slotted plate upon said arms when the brakes are in their normal position.

The lower side edges of the slotted plate 19 are provided with L-shaped flanged shoe 21 21, said shoes lying in close proximity to and in alinement with the rails 3 3 and the wheels 2 2 of the car. The vertical portions 22 22 of the shoes are loosely connected by chains 23 to the platform or body 1 of the car, whereby when the shoes are released to brake the wheels of the car said shoes cannot become displaced or detached from said car.

In lieu of the shoes 21 I may employ shoes 24 and 25, the shoe 24 carrying one depending flange 26 while the shoe 25 carries two depending flanges 27 27, in either instance the flanges being adapted to engage the sides of the rails 3 3 and prevent said shoes from becoming displaced from the rails while being used.

The normal position of the brakes is illustrated in Fig. 1 of the drawings, and, a suming that the car has become uncontrollable, the motorman or operator of the car depresses the tread 16, which elevates the pawl 12 and releases the lever 9. The weight of the slotted plate 19, together with its shoes, permits of the shoes and plate descending until the shoes 21 21 engage the rails 3 3. Immediately upon the shoes engaging the rails the wheels 2 2, owing to the impetus of the car, ride upon the shoes and cause a gradual retardation in the movement of the car, which eventually stops. The motorman or operator of the car can easily and quickly return the shoes 21 to their normal position by backing the car off the shoes and throwing the lever 9 forward until the pawl 12 engages in the toothed bar 14, said pawl returning the latch 15 to its normal position.

In Fig. 6 of the drawings I have illustrated a brake-shoe adapted to be used in connection with the wheels of a vehicle equipped with my improved brake mechanism. It will be noted that the shoe is flanged to brace the tire of the wheel; and in this connection the shoe, together with the brake mechanism, may be readily used as a vehicle-replacer for removing the wheels of a vehicle from the grooves of a car-track.

While my improved brakes are particularly adapted for street-cars they can readily be used in connection with inclined railways, pit-cars, steam railway-cars, and similar vehicles.

What I claim, and desire to secure by Letters Patent, is—

1. In a safety car-brake, the combination with a car-platform supported by wheels adapted to travel upon rails, of a depending bracket carried by said platform, bell-crank levers pivotally connected to said bracket, depending arms carried by said platform, a slotted plate movably supported upon said arms and connecting with said bell-crank levers, L-shaped shoes carried by said slotted plate and loosely connecting with said platform, means to normally hold said shoes in close proximity to said wheels and said rails, and means to release the first-named means, substantially as described.

2. In an emergency-brake, the combination with a car-platform, of a bracket secured thereto, and having depending ends, bell-crank levers pivoted to the depending ends of said bracket, an operating-lever connected to said bell-cranks, a slotted plate, links connecting said plate to said bell-cranks, angular arms carried by the platform to engage said slotted plate, shoes carried by said plate, and loose connections between said shoes and the platform.

3. In an emergency-brake, a pair of track-shoes, a slotted plate supporting the shoes, a support attached to a car-platform, bell-cranks pivotally connected to said support, links connecting one end of said bell-cranks to the supporting-plate, a pivoted actuating-lever, an angular lever and a cross-bar connecting the other ends of said bell-cranks to the actuating-lever, a notched bar carried by the car-platform, a pawl pivoted to the actuating-lever and engaging said notched bar, and a strip to release said pawl whereby the brake-shoes are permitted to drop by gravity to engage the track, substantially as described.

In testimony whereof I affix my signature in the presence of two witnesses.

WILLIAM MARTIN.

Witnesses:
E. E. POTTER,
MAX H. SROLOVITZ.